UNITED STATES PATENT OFFICE.

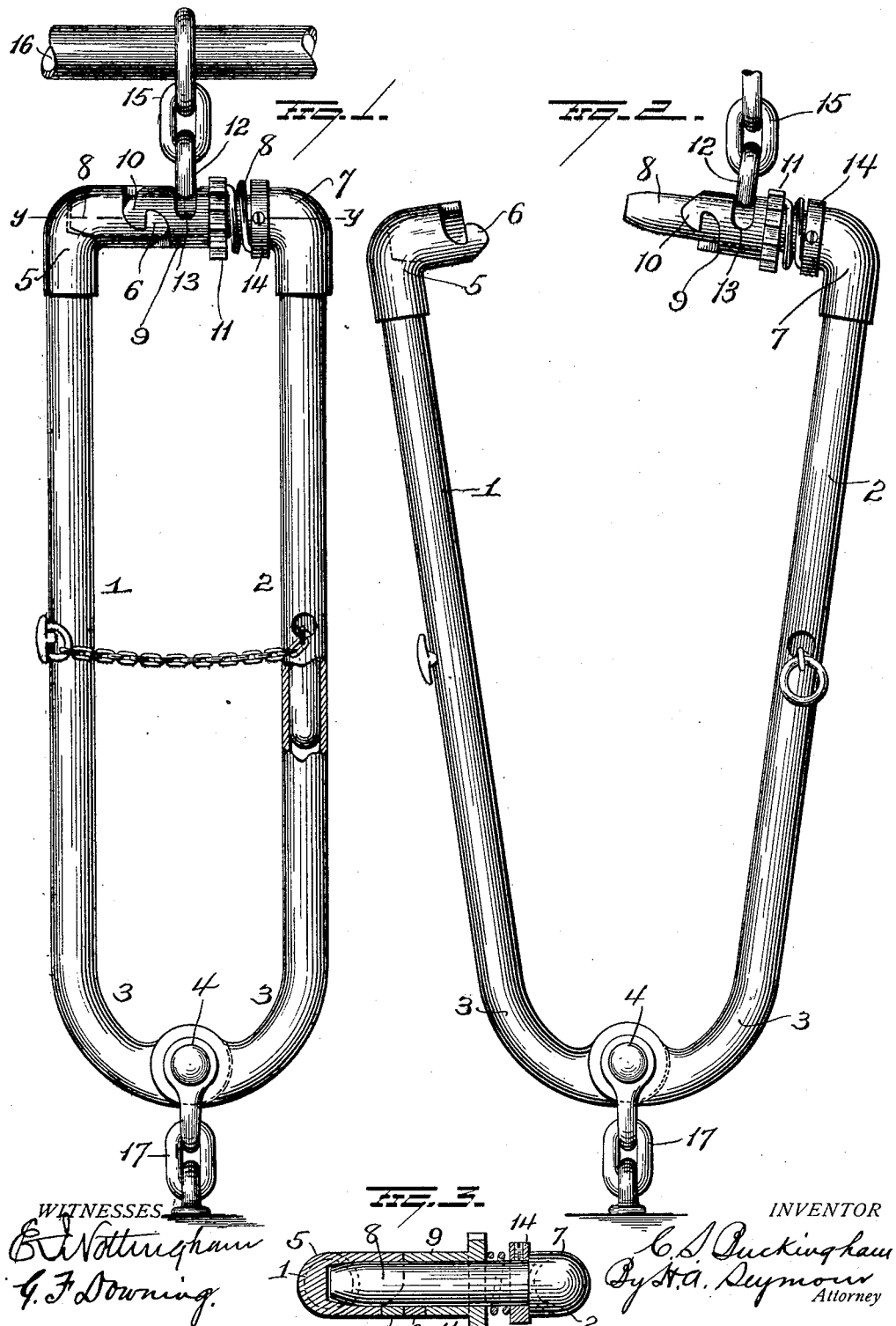

CHARLES SUMMERFIELD BUCKINGHAM, OF ECCLESTON, MARYLAND, ASSIGNOR TO HIMSELF AND SAMUEL M. SHOEMAKER, OF ECCLESTON, MARYLAND.

STANCHION.

1,119,570.        Specification of Letters Patent.        Patented Dec. 1, 1914.

Application filed December 15, 1913. Serial No. 806,899.

*To all whom it may concern:*

Be it known that I, CHARLES S. BUCKINGHAM, of Eccleston, in the county of Baltimore and State of Maryland, have invented certain new and useful Improvements in Stanchions; and I do hereby declare the following to be a full, clear, and exact description of the invention, such as will enable others skilled in the art to which it appertains to make and use the same.

This invention relates to improvements in stanchions and more particularly to that type in which the stanchion is loosely supported at its respective ends, the object of the invention being to provide simple and efficient means for locking the upper ends of the pivoted members of the stanchion, and to so construct such locking means that the same may be easily and quickly manipulated and not be liable to become accidentally unlocked.

With these and other objects in view, the invention consists in certain novel features of construction and combinations of parts as hereinafter set forth and pointed out in the claims.

In the accompanying drawings, Figure 1 is a view in elevation showing the stanchion closed; Fig. 2 is a similar view showing the stanchion open, and Fig. 3 is a sectional view on the line $y$—$y$ of Fig. 1.

1—2 represent the upright bars provided at their lower ends with inwardly curved lower arms 3 having flattened overlapping portions pivotally connected or hinged together, as at 4. An elbow 5 is secured to the upper end of the bar or member 1 and the wall of its horizontal arm is cut-away to form a hook or keeper 6. The upper end of the bar or member 2 is also provided with an elbow 7, from which a rod or pin 8 projects, said rod or pin having a contracted free end and being made of proper size to enter the horizontal member of the elbow 5 when the stanchion is closed, as shown in Fig. 1. A sleeve 9 is revolubly mounted at one end with a latch hook 10 to coöperate with the keeper hook 6 on the elbow 5. The latch sleeve 9 is provided at one end with a serrated or knurled flange 11 to facilitate the manual operation of said sleeve to release it from the keeper hook when it is desired to open the stanchion, and rotary movement of said sleeve is limited in both directions by the shank of an eye 12 secured to the rod or pin 8 and passing through an elongated slot 13 in said sleeve. A spring encircles the rod or pin 8 and is secured to one end to the latch sleeve, the other end of said spring being fastened to a collar 14 adjustably secured to the rod or pin 8 in proximity to the elbow 7. This spring tends to turn the latch sleeve in one direction so that when the stanchion is being closed, the engagement of the beveled end of the latch hook with the beveled end of the keeper hook will cause backward rotation of the sleeve 9 until the shoulders of the two hooks pass alinement with each other, when the spring will operate to rotate the sleeve in the reverse direction and quickly and automatically effect the locking together of the upper ends of the two members of the stanchion. The loop or eye 12 is intended to receive a chain 15 whereby the upper end of the stanchion may be loosely connected with the upper bar 16 of the stall,—the lower end of said stanchion being also loosely connected with the floor of the stall by means of links 17, the upper one of which may be attached to the pivot pin 4.

Various slight changes might be made in the details of construction of our invention without departing from the spirit thereof, or limiting its scope, and hence we do not wish to restrict ourselves to the precise details herein set forth.

Having fully described my invention what I claim as new and desire to secure by Letters-Patent, is:—

1. In a stanchion, the combination of two upright members hinged together at one end, a tubular part having a keeper hook at the free end of one of said members, and a revoluble spring pressed sleeve carried by the other member and having a hook to engage the keeper hook.

2. In a stanchion, the combination of two upright members hinged together at their lower ends, a tubular part having a keeper hook at the upper end of one of said members, a pin rigid with the other member and adapted to enter said tubular part, a sleeve mounted to turn on said pin and provided with a locking hook at one end to engage the keeper hook, a spring encircling said pin and attached at one end to said sleeve, and means for securing the other end of said spring.

In testimony whereof, I have signed this specification in the presence of two subscribing witnesses.

CHARLES SUMMERFIELD BUCKINGHAM.

Witnesses:
JACOB H. KRAFT,
JOHN E. DAVIS.

Copies of this patent may be obtained for five cents each, by addressing the "Commissioner of Patents, Washington, D. C."